United States Patent [19]

Randall

[11] Patent Number: 4,566,216

[45] Date of Patent: Jan. 28, 1986

[54] ICE FISHING RIG

[76] Inventor: Thomas G. Randall, P.O. Box 3810, East Livermore, Me. 04228

[21] Appl. No.: 669,639

[22] Filed: Nov. 8, 1984

[51] Int. Cl.$^4$ ............................................. A01K 97/12
[52] U.S. Cl. ......................................................... 43/17
[58] Field of Search ..................................... 43/16, 17

[56] References Cited

U.S. PATENT DOCUMENTS

| 2,439,451 | 4/1948 | Clark | 43/17 |
| 2,569,946 | 10/1951 | Olesen | 43/17 |
| 2,725,659 | 12/1955 | Marzano | 43/17 |
| 3,641,693 | 2/1972 | Pinnow | 43/17 |

Primary Examiner—Nicholas P. Godici
Assistant Examiner—C. McKee

Attorney, Agent, or Firm—W. R. Hulbert

[57] ABSTRACT

Ice fishing rig comprising an elongated, hollow, waterproof tube which carries a reel at one end, a resilient bar pivoted thereto and movable between a folded position parallel to the tube and an unfolded position transverse thereto. The bar when unfolded rests on the ice on either side of a fishing hole and suspends the rig with the reel submerged. When folded its lies parallel to the tube and engages portions of the reel. The upper end of the tube is transparent and encloses a fluorescent signal visible through 360° and covered by a removable shield. A rod is pivotally mounted within the tube and the upper end engages the shield. The lower end is pivoted by rotation of the reel to release the shield thereby exposing the signal to view from a distance.

6 Claims, 4 Drawing Figures

ICE FISHING RIG

This invention relates to rigs for fishing through the ice in winter.

BACKGROUND OF THE INVENTION

It is known to provide ice fishing rigs which will give a visual signal when a fish takes the bait so that the fisherman, who has retreated to a shelter, will be alerted. It is also known to provide foldable rigs comprising members which may be folded together for carrying and storage and which may be unfolded at the site to be self-supporting over a hole in the ice. Examples are to be found in U.S. Pat. Nos. 2,122,841 and 2,955,374.

It is an object of the invention to provide improvements in such rigs whereby the pivotal members may be readily locked in folded condition and in which the signaling device is protected against the elements to prevent freezing up.

SUMMARY OF THE INVENTION

In accordance with the invention there is provided an ice fishing rig comprising an elongated, hollow waterproof tube, a fishing line reel rotatably mounted at one end of such tube means for holding the tube in fishing position suspended vertically through a hole in the ice with its reel submerged, a rod pivotally held within the tube with its lower end projecting therefrom at a location adjacent the reel, coacting means on the reel and the projecting portion of the rod for pivoting the rod when the reel is rotated, at least the upper end portion of the tube being transparent, a distinctive signal mounted in the upper end of the tube and visible therethrough, an opaque shield slidably held in the upper portion of the tube, the shield in its upper position surrounding and hiding the signal from view and in its lower position exposing the signal to view, and retractable means on the rod operable by pivotal motion of the rod and adapted when extended to retain the shield in its upper position and to release the same when retracted so that the shield can drop by gravity within the tube to reveal the signal.

In preferred embodiments, the means for holding the tube in fishing position comprises a resilient bar, forked at one end and pivoted between its ends to the tube at a location above the reel, the bar being pivotally movable between a folded position in which it lies parallel to the tube with its fork embracing the reel and an unfolded position transverse of the axis of the tube so as to be capable of supporting the latter on the ice in fishing position; preferably the forked portion is adapted to be manually sprung apart and fitted over the reel to hold it in its folded position against the tube; and means are provided sealing the lower end of the tube through which the lower end of said rod projects as well as the upper end of the tube against entry of moisture.

Still further objects, features and advantages of the ice fishing rig of the invention will become apparent from the following detailed description of a preferred embodiment thereof taken in conjunction with the accompanying drawings.

DETAILED DESCRIPTION OF PREFERRED EMBODIMENT

Figures 1, 2, 3:
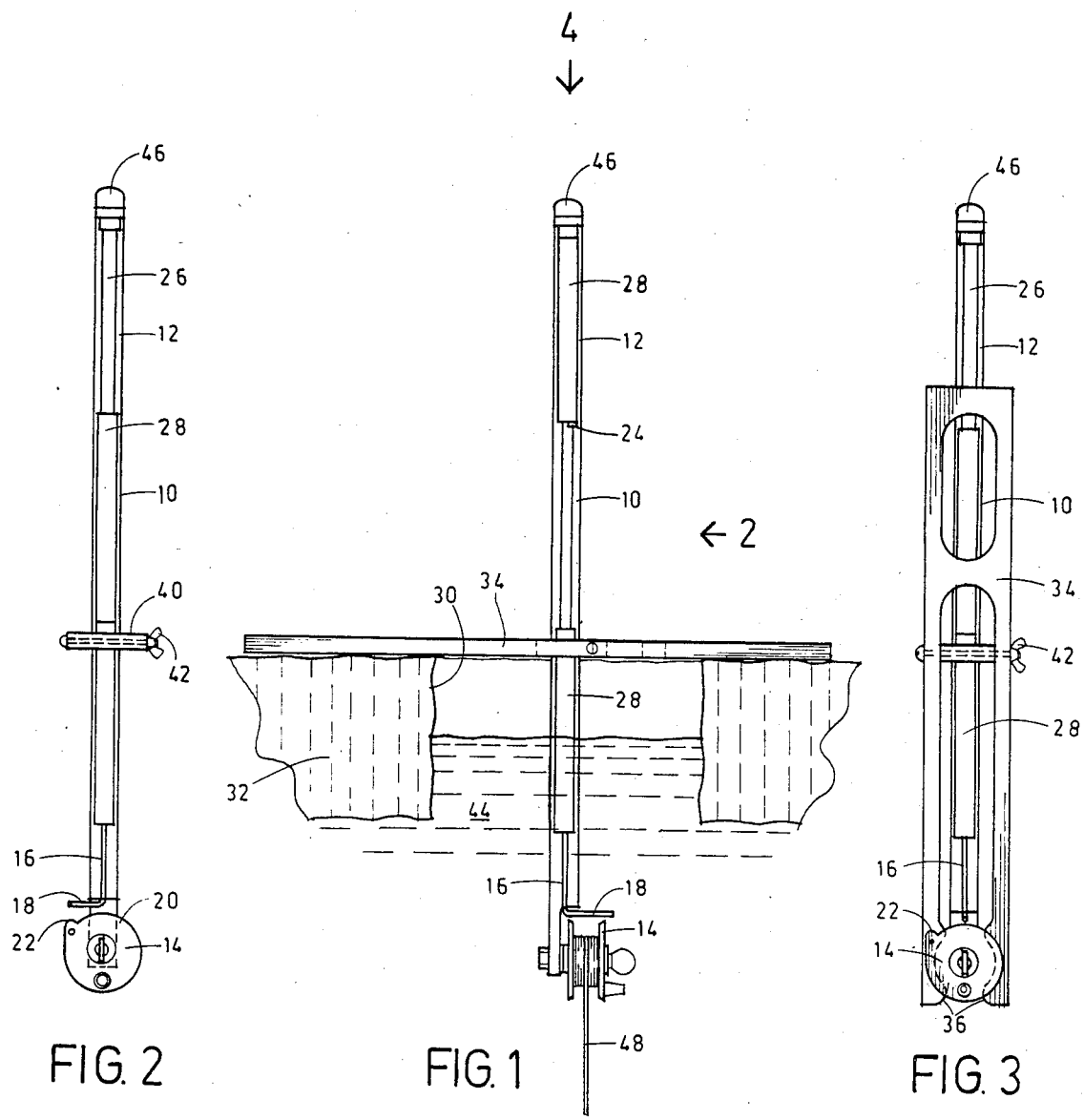
FIG. 1 is an elevation of a preferred embodiment of the invention, unfolded with its signal obscured and supported in fishing position over a hole in the ice of a frozen body of water.
FIG. 2 is a side view of the same taken in the direction of the arrow shown in FIG. 1 with its signal displayed.
FIG. 3 is an elevation similar to that of FIG. 2 but showing the cross-arm which supports the rig on the ice in its stored position folded against the other member.
Figure 4:
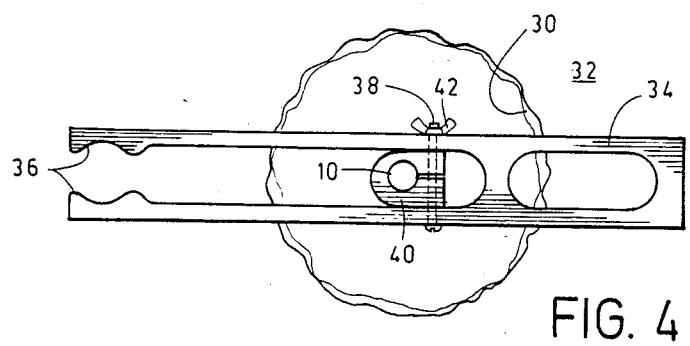
FIG. 4 is a plan view of the rig as shown in FIG. 1 illustrating the pivotal attachment of the cross-arm to the reel supporting tube.

Referring to the drawings, the rig of the invention comprises an elongated, hollow, waterproof, preferably plastic, tube 10, at least the upper portion 12 of which is transparent. Attached to the lower end of the tube 10 is a submersible fishing line reel 14 on which is wound a fishing line 48. Within the tube 10 a rod 16 is mounted for limited pivotal movement. The lower end of the rod is provided with a hook 18 which is adapted to engage the periphery 20 of reel 14 which is provided with a notch 22. When the reel is rotated counterclockwise (FIG. 2) the notched portion 22 engages the hook 18 swinging it to the left and correspondingly pivots the rod within the tube 10.

The upper end of rod 16 is provided with another projecting hook 24 (FIG. 1) for a purpose to be explained. Within the transparent portion 12 of tube 10 there is mounted a cylinder 26 colored red to provide a 360° signal visible from a distance through the wall of the tube. The tube is preferably fluorescent to enable the rig to be easily spotted at night for night fishing. Surrounding the signal 26 is slidably held another, opaque, cylinder, forming a shield which, when in its upper position, obscures the signal but which, when released, may drop by gravity to reveal the signal. The shield 28 is held in its upper shielding position by projection 24. A small counterclockwise pivotal movement of the rod 16 causes the projection 24 to swing from its position shown in FIG. 1, wherein it retains the shield, to a retracted position to release the shield. The latter drops by gravity to the position shown in FIGS. 2 and 3.

To support the tube 10 and its various parts in fishing position over a hole 30 in the ice 32, there is provided a cross-arm 34. The arm 34 is preferably made of durable resilient plastic and is forked at one end as indicated by numeral 36. The arm 34 is pivotally mounted on tube 10 by shaft 38 which passes through a plastic mounting block 40 which in turn is securely mounted on tube 10 at a location suitably spaced from the reel 14. The shaft 38 pivots the cross-arm 34 on the same side of the tube as the reel but at a location more or less intermediate the ends of the tube. A wing nut 42 on shaft 38 serves, when tightened, to clamp the arm in adjusted open (FIG. 1) or closed (FIG. 2) position. In open position the two ends of the arm rest on the ice on either side of the hole to support the rig in fishing position. When folded against the tube 10 the arm is stored parallel to the tube to facilitate storage and carrying. When swung toward its folded position the forks of end 36 may be manually spread to clear one of the end plates of reel 14 so that when released the forks fit between the end plates, as seen in FIG. 3, to aid in holding the cross-arm in stored position and to prevent accidental unwinding of the fish line from the reel.

The top of tube 10 is suitably sealed by cap 46 which is preferably removable to facilitate any needed repairs. The opening at the lower end of tube 10 through which the end of rod 16 protrudes is also provided with suitable seals to prevent entry of water when the reel is submerged.

In operation, the rig is taken to a suitable fishing hole 30 in ice 32 and the cross-arm 34 swung to open position. The rig rests on the two ends of the arm 34. Before lowering the rig into the water 44 a suitable length of line 48 is released, the hook baited and then the tube 10 is inverted to permit the shield 28 to slide to shielding position. The rod 16 is then pivoted to extend projection 24 to shield supporting position. Thereafter the rig is turned right side up, the reel and line lowered into the hole with the rod projection 18 having been first pivoted to "cocked" position adjacent notch 22 of the reel. When a fish takes the line the reel revolves counterclockwise, notch 22 swings the hook 18 to pivot the rod 16 thus retracting the shield support 24, whereupon the shield drops by gravity revealing the signal 26.

While there is herein disclosed and described a presently preferred embodiment of the invention, it should be understood that such is by way of illustration and not limitation and that it is intended that the scope of the invention be limited only by the proper interpretation of the appended claims.

I claim:

1. An ice fishing rig comprising
    an elongated, hollow waterproof tube
    a fishing line reel rotatably mounted at one end of such tube
    means for holding said tube in fishing position suspended vertically through a hole in the ice with its reel submerged
    a rod pivotally held within said tube with its lower end projecting therefrom at a location adjacent said reel
    coacting means on said reel and the projecting portion of said rod for pivoting said rod when said reel is rotated
        at least the upper end portion of said tube being transparent
    a distinctive signal mounted in the upper end of said tube and visible therethrough
    an opaque shield slidably held in the upper portion of said tube
        said shield in its upper position surrounding and hiding said signal from view and in its lower position exposing said signal to view, and
    retractable means on said rod operable by pivotal motion of said rod and adapted when extended to retain said shield in its upper position and to release the same when retracted so that said shield can drop by gravity within said tube to reveal said signal.

2. Ice fishing rig in accordance with claim 1 in which said signal is visible through an arc of 360°.

3. Ice fishing rig in accordance with claim 1 wherein said means for holding said tube in fishing position comprises a resilient bar, forked at one end and pivoted between its ends to said tube at a location above said reel
    said bar being pivotally movable between a folded position in which it lies parallel to said tube with its fork embracing said reel and an unfolded position transverse of the axis of said tube so as to be capable of supporting the latter on the ice in fishing position.

4. Ice fishing rig in accordance with claim 3 wherein said forked portion is adapted to be manually sprung apart and fitted over said reel, the latter serving to aid in holding it in its folded position against said tube.

5. Ice fishing rig in accordance with claim 4 in which said forked position is adapted to aid in preventing accidental unwinding of the fish line from said reel.

6. Ice fishing rig in accordance with any one of claims 1, 3, or 4 including means sealing the lower end of said tube through which the lower end of said rod projects and means sealing the upper end of said tube.

* * * * *